US007475752B2

(12) United States Patent
Borg et al.

(10) Patent No.: US 7,475,752 B2
(45) Date of Patent: Jan. 13, 2009

(54) MECHANICAL ABSORPTION SYSTEMS FOR AN ACTIVE BONNET HINGE

(75) Inventors: Evrard Borg, Martignas sur Jalle (FR); Eric Laspesa, Six Fours (FR); Jean-Paul Nadeau, Ollioules (FR)

(73) Assignee: SNPE Materiaux Energetiques, Paris (FR)

( * ) Notice: Subject to any disclaimer, the term of this patent is extended or adjusted under 35 U.S.C. 154(b) by 554 days.

(21) Appl. No.: 11/254,716

(22) Filed: Oct. 21, 2005

(65) Prior Publication Data

US 2006/0108169 A1    May 25, 2006

(30) Foreign Application Priority Data

Nov. 22, 2004    (FR)    ................................. 04 12343

(51) Int. Cl.
*B60R 21/34*    (2006.01)
(52) U.S. Cl. ..................... 180/274; 180/69.21; 188/374
(58) Field of Classification Search .................. 180/271, 180/274, 69.2, 69.21, 371, 374, 377; 293/133; 296/187.04, 193.11, 187.13
See application file for complete search history.

(56) References Cited

U.S. PATENT DOCUMENTS

| 6,439,330 | B1 * | 8/2002 | Paye ........................ 180/69.21 |
| 6,755,268 | B1 * | 6/2004 | Polz et al. ................. 180/69.21 |
| 6,942,056 | B2 * | 9/2005 | Nadeau et al. .............. 180/274 |
| 7,207,406 | B1 * | 4/2007 | Polz et al. ................. 180/69.21 |
| 2002/0043418 | A1 * | 4/2002 | Lee ............................. 180/274 |
| 2004/0134705 | A1 * | 7/2004 | Nadeau et al. .............. 180/274 |
| 2005/0151393 | A1 * | 7/2005 | Borg et al. .............. 296/187.09 |
| 2005/0257980 | A1 * | 11/2005 | Green et al. ................. 180/274 |
| 2005/0264036 | A1 * | 12/2005 | Kramarczyk et al. ... 296/187.03 |
| 2007/0102219 | A1 * | 5/2007 | Park ........................... 180/274 |

FOREIGN PATENT DOCUMENTS

| DE | 101 08 882 A1 | 9/2002 |
| EP | 1 090 819 A1 | 4/2001 |
| EP | 1 470 971 A2 | 10/2004 |
| FR | 2 848 947 A | 6/2004 |
| JP | A 10194158 | 7/1998 |
| JP | A 2004308785 | 11/2004 |

* cited by examiner

*Primary Examiner*—Paul N. Dickson
*Assistant Examiner*—Joseph Rocca
(74) *Attorney, Agent, or Firm*—Oliff & Berridge, PLC

(57) ABSTRACT

The technical field of the invention is that of the devices used in the field of automotive safety to protect a pedestrian in the event of a frontal impact between the said pedestrian and a motor vehicle.

More specifically, the invention relates to a safety device (1, 101, 201) for raising the bonnet (11, 111, 211) of a motor vehicle in the event of a collision with a pedestrian, comprising a pyrotechnic actuator (2, 102, 202, 302) provided with a thrust piston (17, 117) secured to a mechanism for raising the bonnet (11, 111, 211) and able to deploy the said mechanism which is itself secured to the said bonnet (11, 111, 211), and a blocking device intended to block the said actuator (2, 102, 202, 302) in a given position.

The main characteristic of this device is that it comprises a shock-absorbing device employed when a pedestrian hits the bonnet (11, 111, 211) which has been raised, so that the assembly consisting of the bonnet (11, 111, 211), the raising mechanism and the piston (17, 117) can move under the effect of the impact while at the same time being retarded.

5 Claims, 7 Drawing Sheets

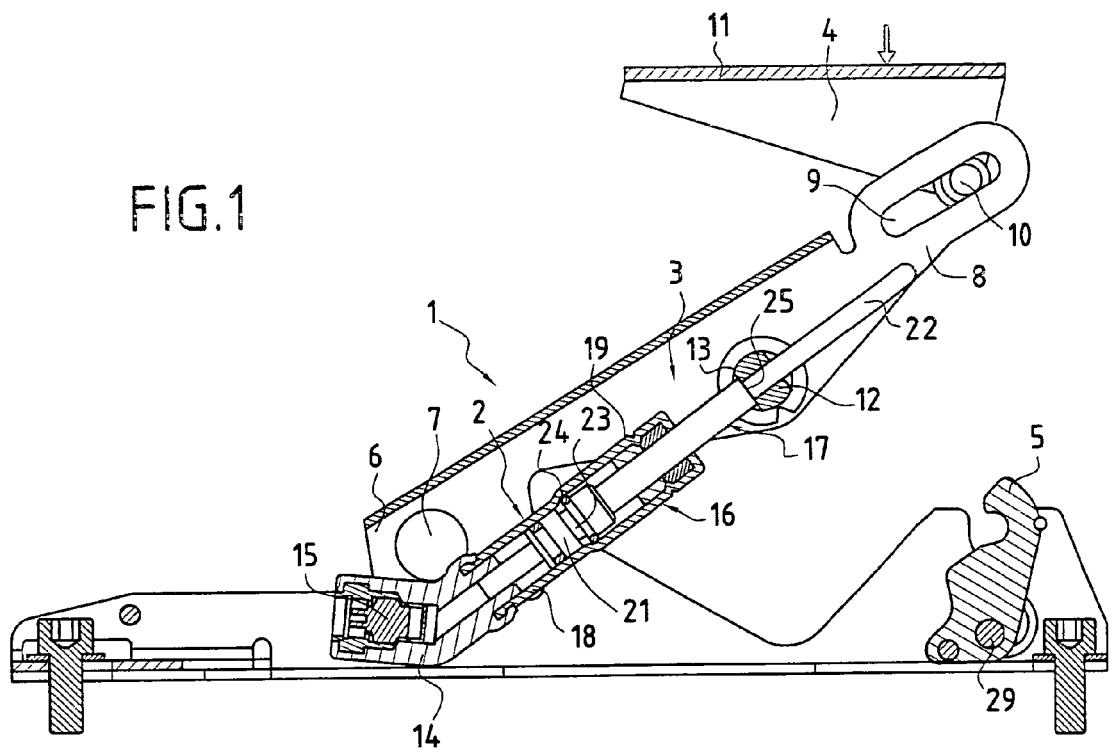
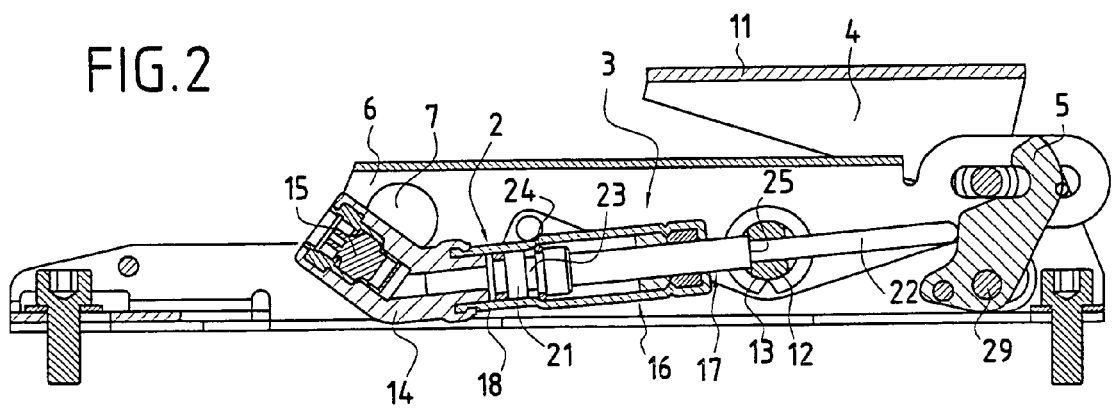

MECHANICAL ABSORPTION SYSTEMS FOR AN ACTIVE BONNET HINGE

The technical field of the invention is that of the devices used in the field of automotive safety to protect a pedestrian in the event of a frontal impact between the said pedestrian and a motor vehicle.

When a pedestrian is struck by the front end of a motor vehicle, the pedestrian's head often comes into direct contact with the bonnet of the vehicle. The impact of the head on the bonnet causes the bonnet to deform. This deformation often occurs to such a point that the bonnet comes into contact with the engine block and any rigid parts such as suspension leg turrets, windscreen wiper mechanisms, etc. The movement of the pedestrian's head is then abruptly halted by the bonnet coming into contact with the engine block and therefore experiences a violent deceleration which may cause the pedestrian serious injury.

The prior art already knows devices which, in the event of an impact between a pedestrian and a motor vehicle, allow the vehicle bonnet to be raised by a certain amount so as to prevent the pedestrian's limbs and especially his head from being stopped, in the impact against the bonnet, by the engine block situated just under the bonnet. In the devices of the prior art, the raising of the bonnet is performed at the rear end of the bonnet, that is to say at the windscreen end, which is the opposite end to the end used for opening or closing the bonnet in normal operation, the bonnet remaining fixed at the front end of the motor vehicle.

Patent FR 2 848 947 relates to a safety device for raising the bonnet of a motor vehicle in the event of a collision, this device being situated under the said bonnet and comprising a mechanism for raising the said bonnet and an actuator, the said bonnet comprising a structure which, in normal operation, allows it to be opened or closed about an axis known as the pivot axis.

The main characteristic of this device is that the raising mechanism first of all undergoes an unlocking phase by performing a first, translational, movement.

The main characteristic of this device is that it undergoes an unlocking phase through a translational movement, followed by a deployment phase in a rotational movement. The safety device also foresees a later, shock-absorbing, phase allowing the bonnet to move with the struck pedestrian so as to lessen the effect of the said impact. However, no way of embodying such a shock-absorbing device is described.

The safety devices according to the invention exhibit shock-absorbing devices the qualities of which are tailored to the requirements associated with the tight confines of motor vehicles and their low cost, namely, small size, simplicity of design and great reliability. Simplicity of design means that the shock-absorbing devices have not to require the addition of parts that need complex and costly machining.

The subject of the present invention is a safety device for raising the bonnet of a motor vehicle in the event of a collision with a pedestrian, comprising a pyrotechnic actuator provided with a thrust piston secured to a mechanism for raising the bonnet and able to deploy the said mechanism which is itself secured to the said bonnet, and a blocking device intended to block the said actuator in a given position, characterized in that it comprises a shock-absorbing device employed when a pedestrian hits the bonnet which has been raised, so that the assembly consisting of the bonnet, the raising mechanism and the piston can move under the effect of the impact while at the same time being retarded. More specifically, since the raising mechanism is blocked in a given position corresponding to a certain raising of the bonnet, the assembly consisting of the bonnet, the said mechanism and the piston can be likened to a single rigid component. The shock-absorbing device has to allow the said assembly to move under the effect of a pedestrian impact, in the opposite direction to the direction in which the bonnet is raised, so as to allow the bonnet to move with the said pedestrian in order to absorb the shock of the impact. For an understanding of the invention and, in particular, of Claim 1, the raising mechanism comprises a link rod and a raising lug.

Advantageously, the pyrotechnic actuator possesses a hollow cylindrical body containing the piston.

According to a first preferred embodiment of the invention, the shock-absorbing device is located inside the pyrotechnic actuator. This embodiment encourages the shock-absorbing device to be of minimum bulk.

As a preference, the shock-absorbing device consists structurally of the blocking device. In other words, the safety devices according to the invention have just one mechanical device which, depending on the applied stresses, may either block the raising mechanism or absorb the shock of the "bonnet+raising mechanism+piston" assembly.

Advantageously, the hollow body exhibits a small-diameter upstream part and a larger-diameter downstream part which parts are connected to one another by a divergent passage, and the piston comprises a peripheral groove partially delimited by the internal wall of the said upstream part. Thus, the piston is positioned in the hollow body in such a way that the groove lies in the upstream part of the said body, the said piston being able to slide in the said upstream part.

As a preference, the groove has a U-shaped cross section so that it exhibits two side walls facing one another and parallel to each other.

Advantageously, a prestressed member is housed in the groove, bearing against the internal wall of the upstream part.

In this way, withdrawal from the internal wall of the upstream part could cause the said member to relax.

As a preference, the prestressed member consists of a snap ring which is an annular component having the shape of a ring provided with an opening. Thus, a radial pressure uniformly distributed over the said component allows the latter to deform elastically in such a way as to move the two ends that delimit the said opening closer together.

According to an alternative form of the embodiment of the invention, the snap ring has a circular cross section.

Advantageously, initiation of the actuator causes the piston to slide until the groove reaches the downstream part of the body, thus causing the snap ring to relax.

In the absence of any particular stress, the snap ring, which is relaxed, prevents the piston from moving in the opposite direction.

As a preference, the material of the upstream part of the body is deformable so as to allow the piston, following a pedestrian impact, to move in the opposite direction, carrying with it the snap ring which forcibly enters the said upstream part of the body which deforms. The length travelled by the snap ring in the upstream part corresponds to the shock-absorbing distance.

According to another preferred embodiment of the invention, the shock-absorbing device consists of at least one weakening feature situated on the hollow body of the actuator. Advantageously, the said feature contributes towards reducing the total length of the said body in the event of a pedestrian impact.

In other words, since the piston, which is secured to the raising mechanism and to the bonnet, is blocked, the hollow cylindrical body will tend to crumple on itself in the direction of its axis in the event of a pedestrian impact.

The reduction in the length of the hollow body corresponds to the shock-absorbing distance.

Advantageously, the blocking device is produced by means of a compressed snap ring situated in a peripheral groove of the piston and which relaxes when the said groove opens into a widened zone of the hollow body thus preventing the piston from moving in the opposite direction. As a preference, the said zones are separated from one another by an internal shoulder. Preferably, the snap ring has a rectangular cross section.

Thus, the relaxed snap ring is blocked against the internal shoulder of the body, preventing the piston from moving in the opposite direction.

According to a second preferred embodiment of the invention, the shock-absorbing device is external to the actuator. Advantageously, the actuator is mounted on a support piece secured to the vehicle and the shock-absorbing device is secured to the said piece.

As a preference, the actuator is in contact with the support piece via a protrusion secured to the said actuator, the said protrusion being able to pivot in the said piece.

Advantageously, the protrusion is of cylindrical shape.

Preferably, the shock-absorbing device consists of a deformable piece borne by the support piece and situated in contact with the pyrotechnic actuator. Preferably, the protrusion is placed in a notch of the support piece, the said protrusion being in contact with the deformable piece.

According to a second preferred embodiment of the invention, the deformable piece has at least one weakening feature able to encourage the said piece to deform following a pedestrian impact.

It is necessary for the hollow body of the actuator to be in contact with the deformable piece because since the piston remains blocked in the said body following a pedestrian impact, it is the said body which will transmit the impact to the said deformable piece.

According to another preferred embodiment of the invention, the deformable piece consists of a corrugated sheet, able to crumple on itself following a pedestrian impact transmitted by the body of the actuator to the said sheet.

Preferably, the support piece has means for guiding the said protrusion, and the shock-absorbing device is included in the said guide means.

Advantageously, the guide means are represented by two oblong openings through each of which the protrusion passes, the said protrusion being able to move in the said openings following a pedestrian impact with the bonnet. As a preference, the openings have, on their outline, a plurality of deformable teeth. The teeth thus increase the roughness of the outline of the said openings. Following the pedestrian impact, the body of the actuator moves, driving the protrusion in the direction dictated by the oblong openings. The movement of the said protrusion in the said openings causes the teeth to bend, thus retarding the said movement.

According to another preferred embodiment of the invention, the width of the openings is smaller than the width of the said protrusion. In this way, under the effect of the impact of a pedestrian with the bonnet, the protrusion is moved forcibly along the said openings, widening them.

The safety devices according to the invention have the advantage of having a well-controlled shock-absorbing function thanks to mechanical devices that are simple, perfectly suited to the small volumes available, conceded by motor vehicles. In addition, this shock-absorbing function can be tailored to a given configuration through a simple structural modification of the materials involved or simply by changing the material since the said materials are in commonplace use and have perfectly known mechanical properties.

A detailed description of four preferred embodiments of a safety device according to the invention is given hereinafter with reference to FIGS. 1 to 19.

FIG. 1 is a view in longitudinal section of a safety device according to the invention equipped with a shock-absorbing device involving a snap ring and which has not yet functioned.

FIG. 2 depicts the device of FIG. 1 once the shock-absorbing device has functioned.

Figure 3:
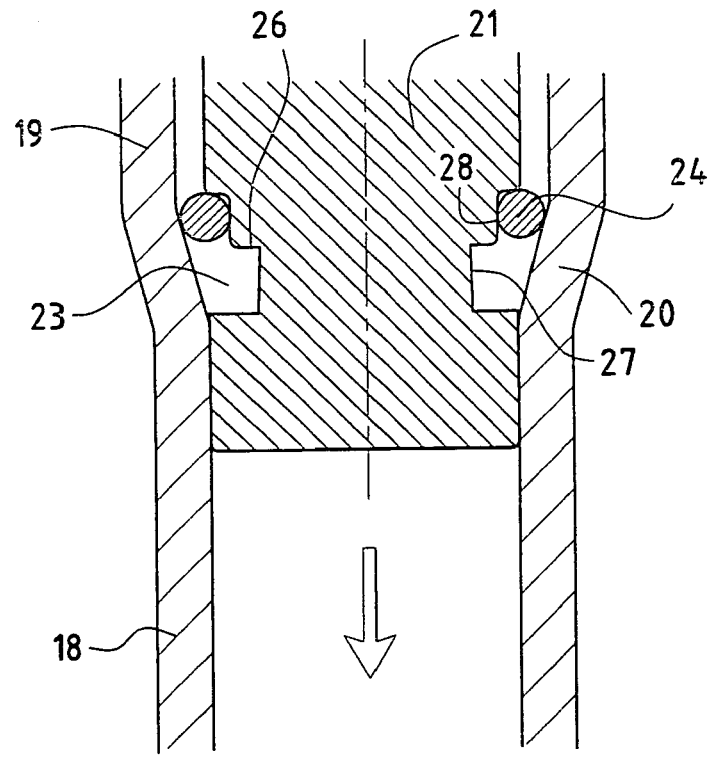
FIG. 3 is an enlarged view in longitudinal axial section of a shock-absorbing device involving a snap ring.

With reference to FIGS. 1 and 2, a first preferred embodiment of a safety device 1 according to the invention comprises a pyrotechnic actuator 2, a link rod 3, a raising lug 4 and a locking hook 5. The link rod 3 has the shape of an elongate part with a variable U-shaped cross section so that it has two mutually parallel faces. The said link rod 3 has an upstream part 6 able to pivot about a pivot pin 7 passing through its two parallel faces, and a downstream part 8 able to be raised when the upstream part 6 pivots about its pin 7.

Figure 4:
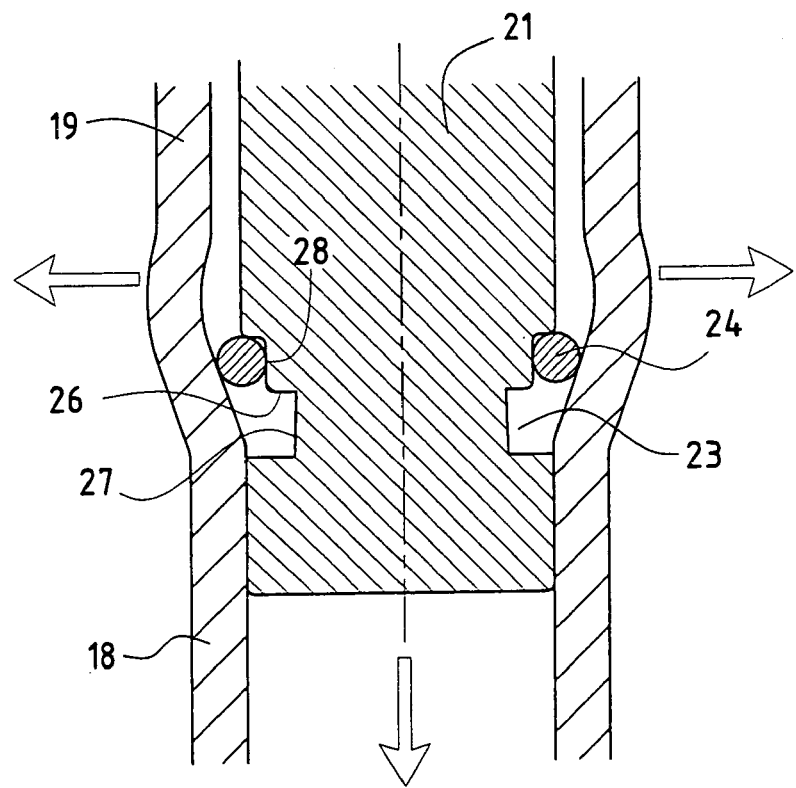
FIG. 4 is an enlarged view in longitudinal axial section of the device of FIG. 3, following a pedestrian impact with the bonnet.

The said downstream part 8 comprises, on each of these faces, an elongate opening 9, each opening having, passing through it, a pivot pin 10 secured to the raising lug 4, the said lug 4 itself being secured to the bonnet 11. The link rod 3 has, on one of its faces, a fixed protrusion 12 equipped with a flat 13. The pyrotechnic actuator 2 comprises a cranked rear part 14 in which a pyrotechnic charge 15 is housed and a front part in the form of a straight hollow cylindrical body 16 in which a piston 17 is housed. The said straight hollow body 16 has a small-diameter upstream part 18 and a larger-diameter downstream part 19 which parts are connected to one another by a divergent passage 20, the said upstream part 18 being in contact with the cranked rear part 14. The piston 17 is made up of a widened body 21 extended by a cylindrical rod 22 comprising a shoulder 25. In this way, the rod 22 exhibits a widened part in contact with the widened body 21 of the piston 17 and a smaller-diameter part. The said widened body 21 of the piston 17 has a peripheral groove 23 and exhibits an outside diameter slightly smaller than the inside diameter of the upstream part 18 of the hollow cylindrical body 16 of the actuator 2. The piston 17 is placed in the actuator 2 in such a way that its widened body 21 is housed in the upstream part 18 of the straight hollow body 16 and can slide therein hermetically. Thus, the peripheral groove 23 is partially delimited by the internal wall of the said upstream part 18 of the hollow body 16. The actuator 2 is able to pivot at the same time as the link rod 3 about a pivot pin not depicted in the figures and which is parallel to the pivot pin 7 of the said link rod 3. With reference to FIGS. 3 and 4, the groove 23 has a shoulder 26 to distinguish a smaller-diameter part 27 corresponding to the deepest part of the said groove 23 from a larger-diameter part 28. A prestressed snap ring 24, of circular cross section, bearing against the internal wall of the upstream part 18 of the hollow cylindrical body 16 is housed in the said groove 23 at its deepest part. An electro-pyrotechnic initiation system is positioned near the pyrotechnic charge 15 to initiate its combustion. The hook 5 is mounted to pivot on the vehicle and can effect a rotary movement about a pivot pin 29.

The way in which this first preferred embodiment of the safety device 1 according to the invention works is as follows.

An electrical impulse device sets off the electro-pyrotechnic ignition system which initiates the combustion of the pyrotechnic charge 15.

The gases delivered move the piston 17 which, in a first phase, unlocks the safety device 1 by exerting thrust on the hook 5 and which, in a second phase, comes to bear against the flat 13 of the protrusion 12 of the link rod 3 via the shoulder 25 of its rod 22, so as to cause the said link rod 3 to rotate about its pin 7. The rotation of the said link rod 3 leads to the raising of the bonnet 11 by virtue of the raising lug 4, the pivot pin 10 of which can move in the elongate openings 9 of the downstream part 8 of the link rod 3. Thus, the piston 17 slides in the straight hollow cylindrical body 16 until the peripheral groove 23 reaches the divergent passage 20 and the snap ring 24 relaxes to occupy the shallower part 28 of the said groove 23. In this final position which corresponds to the one depicted in FIGS. 1 and 3, the snap ring 24 prevents any movement of the piston 17 in the opposite direction, unless external stress is exerted. Thus, the assembly represented by the bonnet 11, the raising lug 4, the link rod 3 and the piston 17 constitutes a rigid component. All of this first phase corresponds to a phase of arming the safety device 1.

With reference to FIG. 4, in the event of a pedestrian impact with the bonnet 11 in the direction shown by the arrow in FIG. 1, the impact thus generated is transmitted to the piston 17, and its intensity is such that the said piston 17 will begin to move in the opposite direction, carrying with it the snap ring 24 which is relaxed. During this movement in the opposite direction, the said snap ring 24 forcibly enters the small-diameter upstream part 18 of the hollow cylindrical body 16 which deforms. This phase of deforming the hollow cylindrical body 16 corresponds to a phase of absorbing the shock of the bonnet 11 because the said bonnet 11 can move under the effect of the pedestrian impact while at the same time being retarded. With reference to FIG. 4, the movement of the bonnet 11 halts when the safety device 1 returns to the re-engagement position. In this embodiment the snap ring 24 has had the dual function of acting as a blocking device and of acting as a shock-absorbing device.

Figure 5:
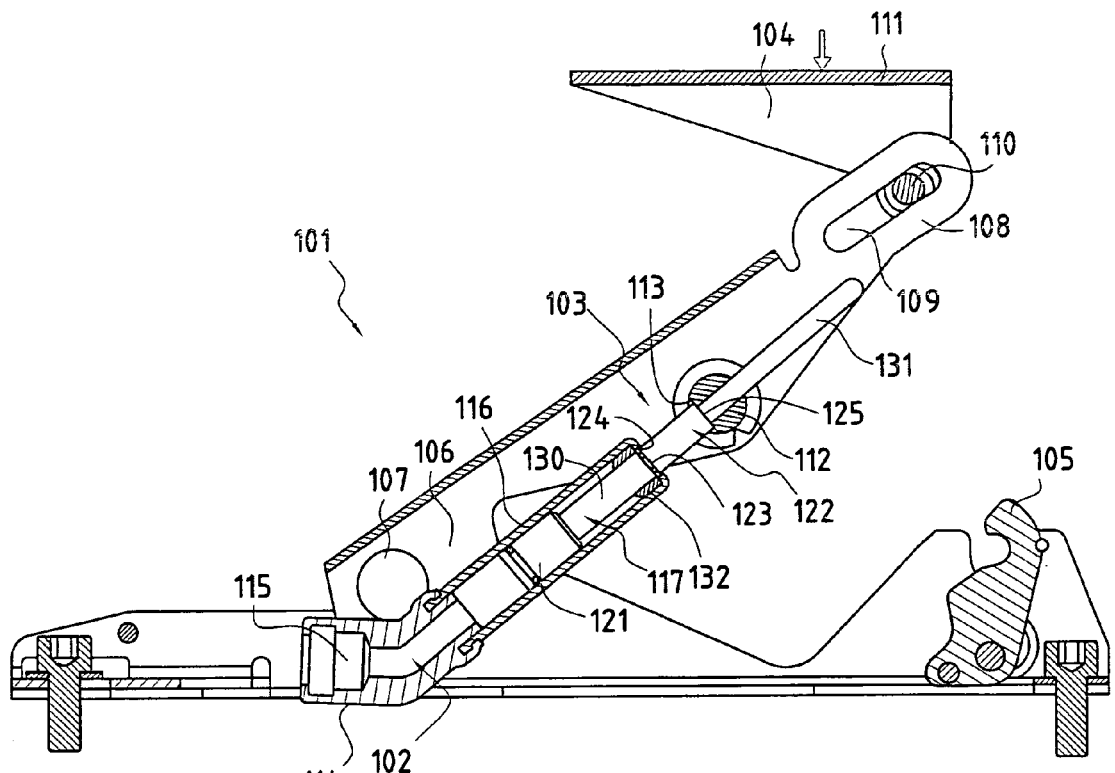
FIG. 5 is a view in partial longitudinal section of a safety device according to the invention, having an actuator with a weakening feature.
Figure 6:
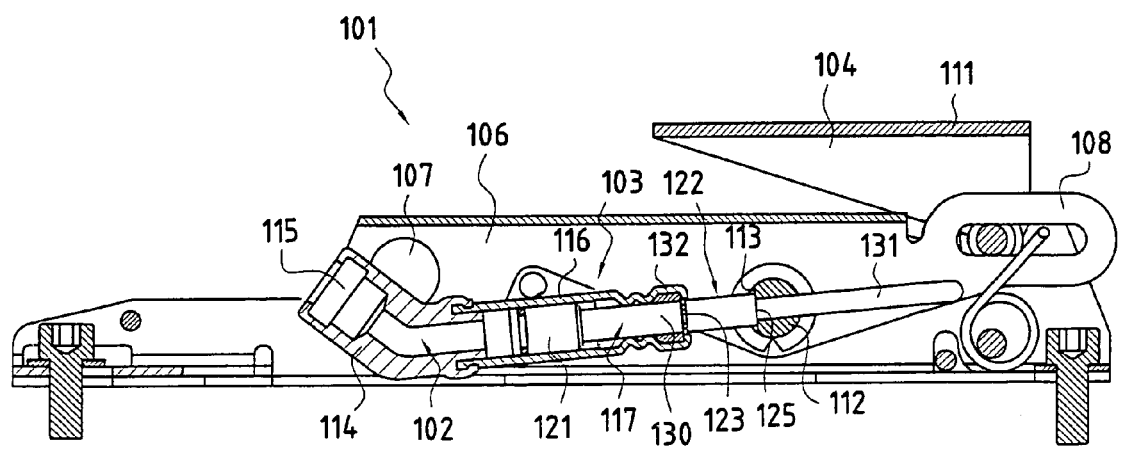
FIG. 6 depicts the device of FIG. 5, following a pedestrian impact with the bonnet.

With reference to FIGS. 5 and 6, a second preferred embodiment of a safety device 101 according to the invention comprises a pyrotechnic actuator 102, a link rod 103, a raising lug 104 and a locking hook 105. The link rod 103 has the shape of an elongate piece of variable U-shaped cross section so that it exhibits two mutually parallel faces. The said link rod 103 has an upstream part 106 able to pivot about a pivot pin 107 passing through its two parallel faces and a downstream part 108 able to be raised when the upstream part pivots about its pin 107.

The said downstream part 108 comprises, on each of its faces, an elongate opening 109, each one having, passing through it, a pivot pin 110 secured to the raising lug 104, the said lug 104 itself being secured to the bonnet 111.

On one of its faces, the link rod 103 has a fixed protrusion 112 equipped with a flat 113. The pyrotechnic actuator 102 comprises a cranked rear part 114 in which a pyrotechnic charge 115 is housed and a front part in the form of a straight hollow cylindrical body 116 in which a piston 117 is housed.

Figure 7:
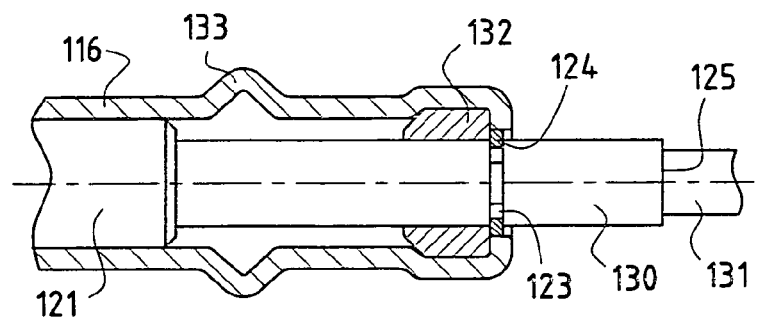
FIG. 7 is an enlarged view in longitudinal axial section of a pyrotechnic actuator of a safety device according to the invention, having a first variant of the weakening feature.
Figure 9:
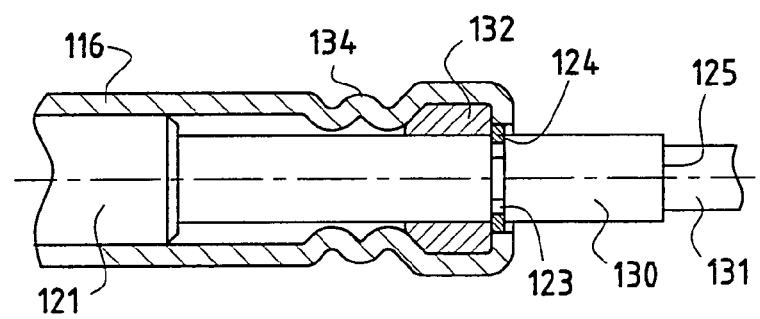
FIG. 9 is an enlarged view in longitudinal axial section of a pyrotechnic actuator of a safety device according to the invention, having a second variant of the weakening feature.

The piston 117 is made up of a widened body 121 extended by a cylindrical rod 122 comprising a shoulder 125. In this way, the rod 122 has a widened part 130 in contact with the widened body 121 of the piston 117 and a smaller-diameter part 121, the said widened part 130 having a peripheral groove 123. The straight hollow cylindrical body 116 has one end in contact with the cranked rear part 114 and a free end equipped with an opening to allow the widened part 130 of the rod 122 to pass, the said opening having a diameter greater than that of the said widened part 130. A cylindrical piece 132 provided with a passage, the diameter of which is appreciably greater than the diameter of the said widened part 130 of the rod 122 but smaller than the diameter of the opening, is fixed inside the straight hollow cylindrical body 116, near its free end. Thus, the widened part 130 of the rod 122 can slide hermetically in the said piece 132 because the opening of the hollow cylindrical body 116, which is too wide, does not permit it. The piston 117 is placed in the actuator 102 in such a way that the peripheral groove 123 is partially delimited by the internal wall of the hollow cylindrical piece 132. A prestressed snap ring 124, of rectangular cross section, is housed in the said groove 123, bearing against the said internal wall. The actuator 102 is able to pivot at the same time as the link rod 103 about a pivot pin not depicted in the figures and which is parallel to the pivot pin 107 of the said link rod 103. With reference to FIGS. 7 and 9, the straight hollow cylindrical body 116 has a weakening feature 133, 134 either in the form of a narrow bulging 133 of the said body 116 or in the form of two successive restrictions 134 of the said body 116.

The way in which this second preferred embodiment of a safety device 101 according to the invention works is as follows.

An electrical impulse sets off the electropyrotechnic ignition system which initiates the combustion of the pyrotechnic charge 115. The gases delivered move the piston 117 which, in a first phase, unlock the safety device 101 by exerting thrust on the hook 105 and which, in the second phase, comes to bear against the flat 113 of the protrusion 112 of the link rod 103 via the shoulder 125 of its rod 122 to cause the said link rod 103 to rotate about its pin 107. The rotation of the said link rod 103 leads to the raising of the bonnet 111 by virtue of the raising lug 104, the pivot pin 110 of which can move in the elongate openings 109 of the downstream part 108 of the link rod 103. Thus, with reference to the FIGS. 7 and 9, the piston 117 slides in the straight hollow cylindrical body 116 until the peripheral groove 113 reaches the opening at the end of the straight hollow cylindrical body 116 and the snap ring 124 relaxes. In this position, the relaxed snap ring 124 acts as a blocking device, preventing, inter alia, any movement of the piston 117 in the opposite direction. In this way, the assembly represented by the bonnet 111, the raising lug 104, the link rod 103 and the piston 117 constitutes a rigid component. All of this first phase corresponds to a phase of arming the safety device 101 which is identical to the phase described in respect of the first preferred embodiment of the invention.

Figure 8:
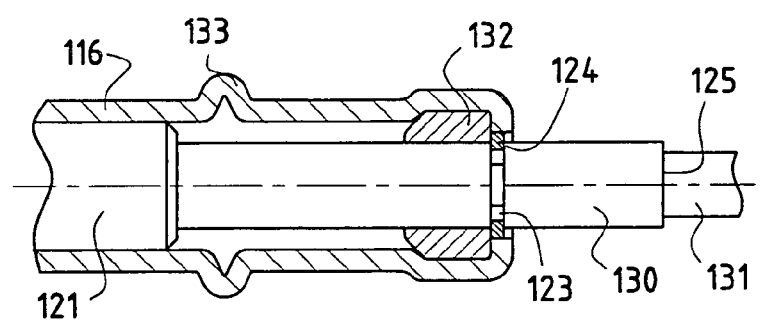
FIG. 8 depicts the actuator of FIG. 7 following the pedestrian impact with the bonnet.
Figure 10:
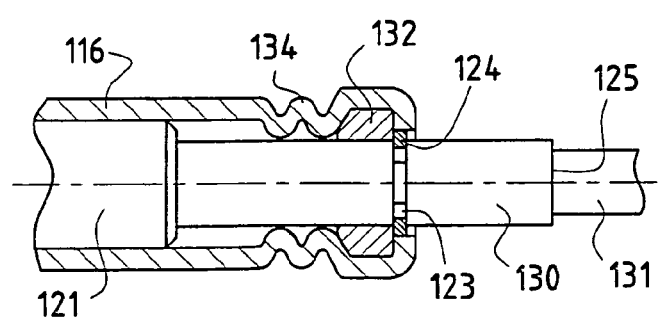
FIG. 10 depicts the actuator of FIG. 9 following the pedestrian impact with the bonnet.

Upon pedestrian impact with the bonnet 111 in the direction shown by the arrow in FIG. 5, the impact thus generated is transmitted to the piston 117, solidly blocked by the snap ring 124. With reference to FIGS. 8 and 10, the forces will then be transferred to the weakening features 133, 134 of the hollow cylindrical body 116 which will react by crumpling on itself, thus leading to a reduction in its length. This crumpling allows the bonnet 111 to move under the effect of the pedestrian impact, while at the same time being retarded.

With reference to FIG. 6, the movement of the bonnet 111 halts when the safety device 1 returns to the re-engaged position.

Figure 11:
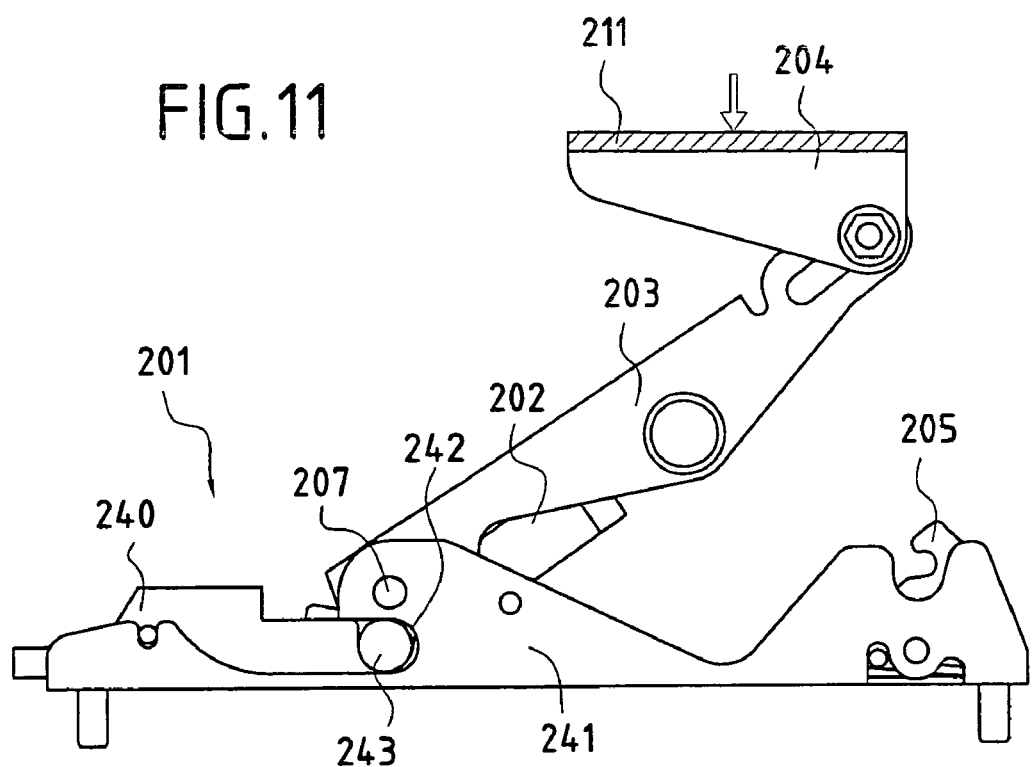
FIG. 11 is a side view of a safety device according to the invention equipped with an external shock-absorbing device comprising a piece with a weakening feature.
Figure 12:
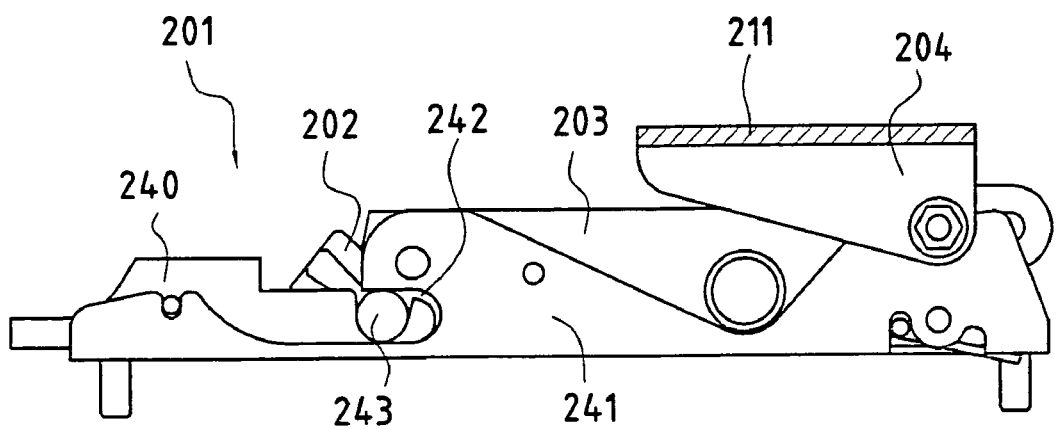
FIG. 12 depicts the device of FIG. 11 following a pedestrian impact with the bonnet.

With reference to FIGS. 11 and 12, a third preferred embodiment of a safety device 201 according to the invention differs from the second preferred embodiment described hereinabove in that the weakening features are no longer produced on the body of the pyrotechnic actuator 202 but are produced on a deformable piece 240 placed in contact with the said actuator 202, on the same side as the pyrotechnic charge, not depicted in FIGS. 11 and 12. The safety device 201 is fixed to the vehicle by means of an elongate support piece 241 having a variable U-shaped cross section, the said piece 241 having, on each of these two parallel edges, an elongate notch 242 each facing the other. The cranked rear part of the pyrotechnic actuator 202 comprises a cylindrical lateral protrusion 243, the diameter of which is appreciably smaller than the width of the notch 242, and the actuator 202 is positioned with respect to the support piece 241 in such a way that the said protrusion 243 lies in the closed end of the said notch 242. During the phase of arming the safety device 201, the protrusion 243, the axis of which is parallel to the pin 207 of the link rod 203, will constitute the axis of rotation of the actuator 202.

Figure 13:
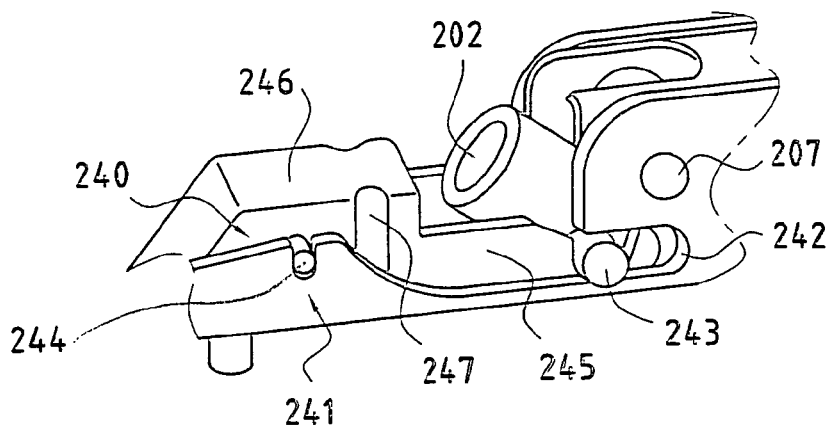
FIG. 13 is a perspective view of the relative arrangement of the deformable piece and of the pyrotechnic actuator.

With reference to FIG. 13, the deformable piece 240 is fixed to the support piece 241 by means of a peg 244 secured to the deformable piece 240 and which becomes inserted in a notch of the said support piece 241. The deformable piece 240 comprises a body 246 which on the whole has a U-shaped cross section and is extended by two parallel lugs 245 each having, at its end, a notch intended to house the protrusion 243.

The support piece 241, the deformable piece 240 and the pyrotechnic actuator 202 are arranged in such a way that the protrusion 243 finds itself blocked in the closed end of the elongate notch 242 of the support piece 241 by the notches of the two lugs 245 of the deformable piece 240. The body 246 of the deformable piece 240 comprises a weakening feature 247 in the form of a narrow restriction.

The way in which this third preferred embodiment of a safety device 201 according to the invention works is as follows.

The phase of arming the safety device 201 is in every respect identical to the equivalent phase described for the first and second preferred embodiments of the invention.

Upon pedestrian impact with the bonnet 211 in the direction shown by the arrow in FIG. 11, since the piston 217 is solidly blocked in the actuator 202 by the blocking device involving the snap ring of rectangular cross section, the impact is transmitted to the protrusion 243 having passed through the raising lug 204 and the link rod 203. The intensity of the said impact is such that the actuator 202 will exert thrust on the deformable piece 240 via the protrusion 243, the said piece 240 then crumpling on itself at its weakening feature 247. This deformation of the piece 240 allows the bonnet 111 to move under the effect of the pedestrian impact, while at the same time being retarded. According to FIG. 12, the movement of the bonnet 211 halts when the safety device 201 has returned to the re-engaged position. It should be noted that, during the arming phase, the piece 240 is sized in such a way as to counter the thrust forces of the actuator 202 without experiencing plastic deformation.

Figure 14:
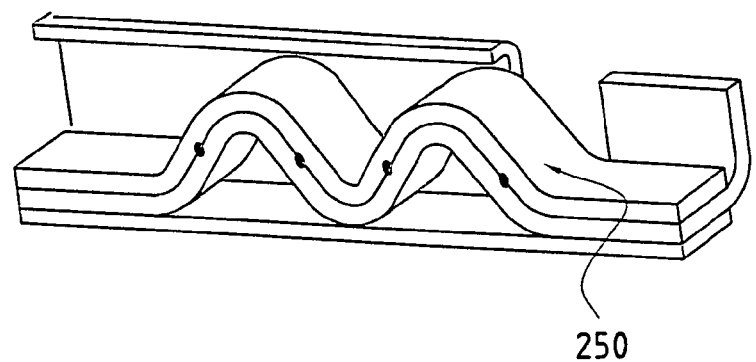
FIG. 14 is a perspective view of a concertina piece acting as a shock-absorbing device for a safety device according to the invention.
Figure 15:
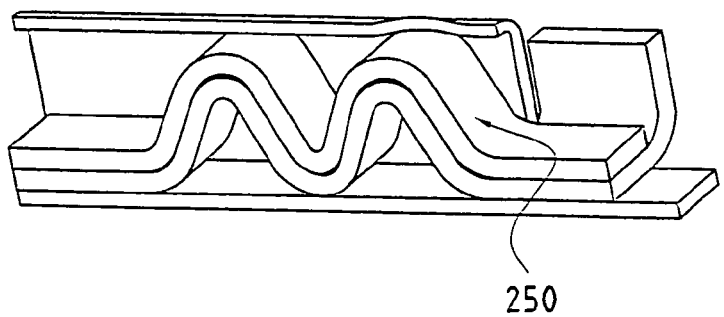
FIG. 15 depicts the piece of FIG. 14 following a pedestrian impact with the bonnet.

With reference to FIG. 14, the deformable piece may consist of a corrugated sheet 250 placed in contact with the pyrotechnic actuator. With reference to FIG. 15, in the event of a pedestrian impact, the said actuator exerts thrust in the direction shown by the arrow on the said sheet which will crumple, allowing the bonnet to move while at the same time being retarded.

Figure 16:
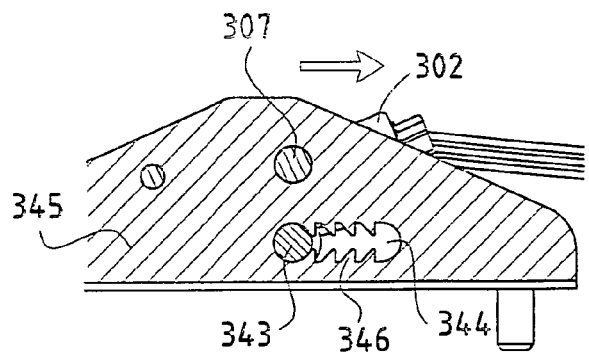
FIG. 16 is a side view of part of the support piece for the pyrotechnic actuator, the said piece being equipped with two toothed side openings.
Figure 17:
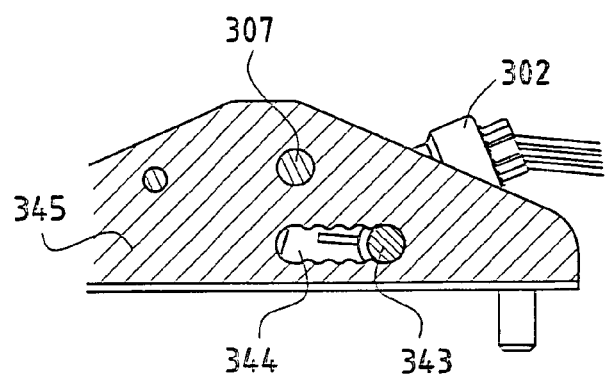
FIG. 17 depicts the part of the support piece of FIG. 16 following a pedestrian impact with the bonnet.

With reference to FIGS. 16 and 17, a fourth preferred embodiment of a safety device according to the invention differs from the third preferred embodiment described above in that the deformable piece has been removed and in that the protrusion 343 passes through two oblong openings 344 facing one another and placed on the two parallel edges of a support piece 345 secured to the vehicle and having a variable U-shaped cross section. The axis of the protrusion 343 is parallel to the pivot pin 307 of the link rod. Each of the two openings 344 comprises a plurality of triangular and deformable teeth 346, situated along their outline.

The way in which this fourth preferred embodiment of a safety device according to the invention works is as follows.

The phase of arming the safety device is in every respect identical to the equivalent phase described for the first three embodiments of the invention described hereinabove.

Upon pedestrian impact with the bonnet, the impact is transmitted to the protrusion 343. The intensity of the said impact is such that the actuator 302 will move in the direction shown by the arrow in FIG. 13, carrying along the protrusion 343 which itself moves in the openings 344 crumpling the teeth 346 as it passes. The openings 344 encourage the movement of the bonnet following a pedestrian impact with the bonnet, and the teeth 346, which crumple, retard the said movement.

Figure 18:
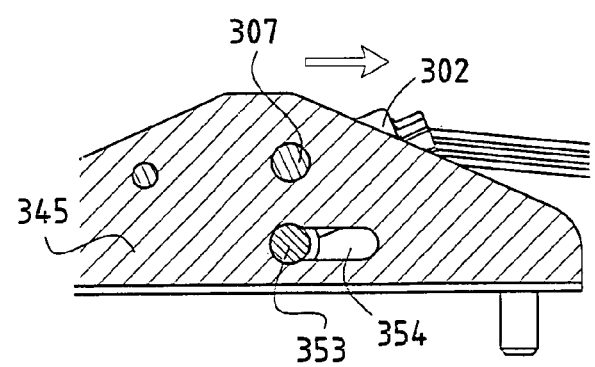
FIG. 18 is a side view of part of the support piece for the pyrotechnic actuator and the said piece being equipped with two narrow side openings.
Figure 19:
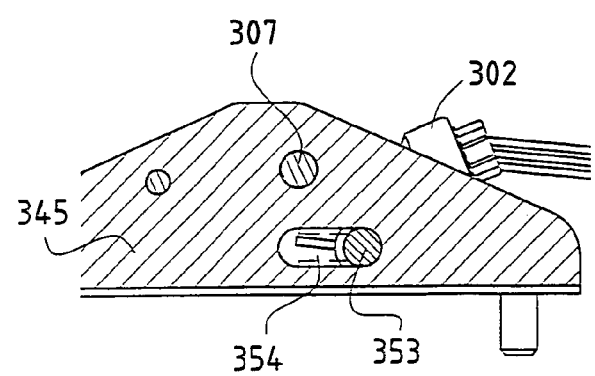
FIG. 19 depicts the part of the support piece of FIG. 18 following a pedestrian impact with the bonnet.

With reference to FIGS. 18 and 19, the two oblong openings 354 are smaller in width than the diameter of the protrusion 353.

Following the pedestrian impact with the bonnet, the actuator 302 moves in the direction shown by the arrow in FIG. 18 carrying along the protrusion 353 which itself moves forcibly in the openings 354. The openings, which widen as they deform as the said protrusion 353 passes, contribute to retarding the movement of the bonnet.

The invention claimed is:

1. Safety device (1, 101, 201) for raising the bonnet (11, 111, 211) of a motor vehicle in the event of a collision with a pedestrian, comprising a pyrotechnic actuator (2, 102, 202, 302) possessing a hollow body (16, 116) containing a thrust piston (17, 117) secured to a mechanism for raising the bonnet (11, 111, 211) and able to deploy the said mechanism which is itself secured to the said bonnet (11, 111, 211), a blocking device intended to block the said actuator (2, 102, 202, 302) in a given position and a shock-absorbing device employed when a pedestrian hits the bonnet (11, 111, 211) which has been raised, so that the assembly consisting of the bonnet (11, 111, 211), the raising mechanism and the piston (17, 117) can move under the effect of the impact while at the same time being retarded, characterized in that the hollow body (16) exhibits a small-diameter upstream part (18) and a larger-diameter downstream part (19) which parts are connected to one another by a divergent passage (20), and in that the piston (17) comprises a peripheral groove (23) partially delimited by the internal wall of the said upstream part (18), the said groove (23) housing a prestressed member bearing against the said internal wall.

2. Device according to claim 1, characterized in that the prestressed member (24) consists of a snap ring.

3. Device according to claim 2, characterized in that initiation of the actuator (2) causes the piston (17) to slide until the groove (23) reaches the downstream part (19) of the body (16), thus causing the snap ring (24) to relax.

4. Device according to claim 3, characterized in that the material of the upstream part (18) of the body (16) is deformable so as to allow the piston (17), following an impact of a pedestrian with the bonnet, to move in the opposite direction, carrying with it the snap ring (24) which forcibly enters the said upstream part (18) of the body (16) which deforms.

5. Device according to claim 2, characterized in that the snap ring (24) has a circular cross section.

* * * * *